US012764481B2

(12) United States Patent
Courtois

(10) Patent No.: US 12,764,481 B2
(45) Date of Patent: Oct. 13, 2026

(54) SYSTEMS AND METHODS FOR FACILITATING FITTING OF A HEARING DEVICE WITH ACTIVE NOISE CANCELLATION

(71) Applicant: SONOVA AG, Staefa (CH)

(72) Inventor: Gilles Courtois, Uerikon (CH)

(73) Assignee: Sonova AG, Staefa (CH)

( * ) Notice: Subject to any disclaimer, the term of this patent is extended or adjusted under 35 U.S.C. 154(b) by 162 days.

(21) Appl. No.: 18/781,231

(22) Filed: Jul. 23, 2024

(65) Prior Publication Data

US 2026/0032395 A1 Jan. 29, 2026

(51) Int. Cl.
*H04R 25/00* (2006.01)
*H04R 1/10* (2026.01)

(52) U.S. Cl.
CPC ........... *H04R 25/70* (2013.01); *H04R 1/1083* (2013.01); *H04R 25/507* (2013.01); *H04R 2460/01* (2013.01)

(58) Field of Classification Search
CPC .... H04R 25/70; H04R 1/1083; H04R 25/507; H04R 2460/01
USPC ............................... 381/60, 58, 56, 312, 317
See application file for complete search history.

(56) References Cited

U.S. PATENT DOCUMENTS 10,511,921 B2 12/2019 Blamey et al.
11,030,989 B2 6/2021 Thormundsson et al.
11,109,169 B2 8/2021 Gozzelino
2012/0051569 A1 3/2012 Blamey et al.
2017/0238106 A1* 8/2017 Theill .................... H04R 25/35 381/314
2018/0182371 A1 6/2018 Thormundsson et al.
2021/0112350 A1 4/2021 Chau et al.
2022/0201404 A1 6/2022 Xu et al.
2022/0400350 A1* 12/2022 De Vries .............. H04R 25/505

(Continued)

FOREIGN PATENT DOCUMENTS

CN 113301466 A 8/2021
DE 102021132434 A1 6/2023
EP 2396975 B1 1/2018

(Continued)

OTHER PUBLICATIONS

Leslie, M. (2022). "New US Rules Promise to Unlock Hearing Aid Availability", Engineering, 2022, 14(7):7-9.

(Continued)

*Primary Examiner* — Thjuan K Addy
(74) *Attorney, Agent, or Firm* — ALG Intellectual Property, LLC

(57) ABSTRACT

An exemplary method includes a hearing system directing, during a fitting session during which the hearing system operates in accordance with a fitting mode, the hearing system to provide to the user a plurality of audio prompts at a plurality of different presentation levels, determining, for the plurality of audio prompts, a plurality of speech recognition levels, each speech recognition level of the plurality of speech recognition levels corresponding to a respective presentation level of the plurality of different presentation levels, and setting, based on the plurality of speech recognition levels, a particular active noise canceling (ANC) strength for use in a normal operation mode of the hearing system subsequent to the fitting session for the user.

17 Claims, 7 Drawing Sheets

(56) References Cited

U.S. PATENT DOCUMENTS

| | | | | |
|---|---|---|---|---|
| 2022/0417647 | A1 | 12/2022 | Sun et al. | |
| 2024/0397275 | A1* | 11/2024 | Anderson | H04R 25/70 |

FOREIGN PATENT DOCUMENTS

| | | | |
|---|---|---|---|
| WO | 2018025250 | A1 | 2/2018 |
| WO | 2019089530 | A1 | 5/2019 |
| WO | 2020214482 | A1 | 10/2020 |
| WO | 2021050424 | A1 | 3/2021 |

OTHER PUBLICATIONS

Shehorn et al. (2020). "Associations between speech recognition at high levels, the middle ear muscle reflex and noise exposure in individuals with normal audiograms", Hearing Research, 2020, 0378-5955.

* cited by examiner

SYSTEMS AND METHODS FOR FACILITATING FITTING OF A HEARING DEVICE WITH ACTIVE NOISE CANCELLATION

BACKGROUND INFORMATION

Hearing devices (e.g., hearing aids) are used to improve the hearing capability and/or communication capability of users of the hearing devices. Such hearing devices are configured to process a received input sound signal (e.g., ambient sound) and provide the processed input sound signal to the user (e.g., by way of a receiver (e.g., a speaker) placed in the user's ear canal or at any other suitable location).

Hearing devices may be customized for each user during a fitting session, where optimal parameters of the hearing device for the user are determined, typically by a hearing care professional. Some hearing devices may be configured for fitting by users. However, such self-fitting sessions may not optimize the hearing devices for all hearing profiles.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Systems and methods for improving hearing performance by a hearing device are described herein. As will be described in more detail below, an exemplary system may comprise a memory storing instructions and a processor communicatively coupled to the memory and configured to execute the instructions to perform a process. The process may comprise directing, by a processor during a fitting session during which the hearing system operates in accordance with a fitting mode, the hearing system to provide to the user a plurality of audio prompts at a plurality of different presentation levels, determining, by the processor and for the plurality of audio prompts, a plurality of speech recognition levels, each speech recognition level of the plurality of speech recognition levels corresponding to a respective presentation level of the plurality of different presentation levels, and setting, by the processor and based on the plurality of speech recognition levels, a particular active noise canceling (ANC) strength for use in a normal operation mode of the hearing system subsequent to the fitting session for the user.

By using systems and methods such as those described herein, it may be possible to improve facilitation of fitting of hearing devices, particularly for users experiencing hidden hearing loss, where the user may have a relatively normal audiogram but have difficulty hearing in noise. Such users may, counterintuitively, benefit from a reduction of sound level, which may improve speech recognition. Hearing devices may implement such a reduction in sound level by applying active noise cancellation (ANC). However, as ANC strength increases, the user may experience a reduction in environmental awareness. The user may further be susceptible to the Lombard effect, which may result in the user speaking at a sound level that is too soft for the acoustic level of the environment.

Thus, systems and methods described herein may facilitate fitting of hearing devices by including a determining of an optimal ANC strength for use during normal operation. The optimal ANC strength may optimize between increased speech recognition while minimizing the Lombard effect and/or environmental awareness reduction. Examples of such optimal levels are described herein. In this manner (and as other examples described herein), the system may improve the hearing experience for the user of the hearing device. Other benefits of the systems and methods described herein will be made apparent herein.

Figure 1:
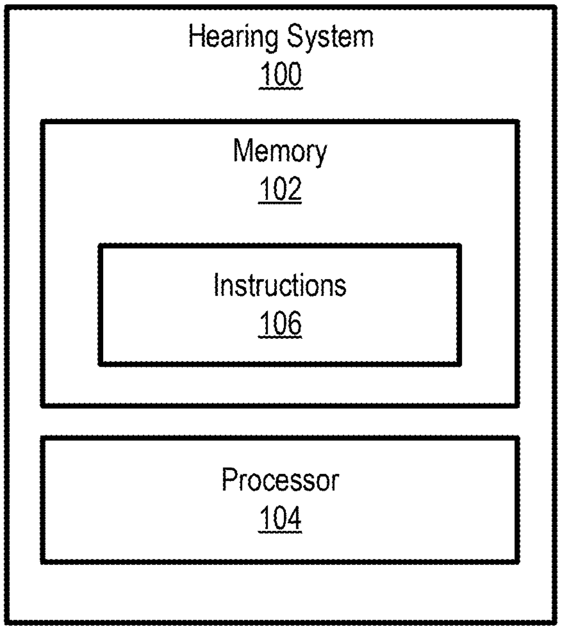
FIG. 1 illustrates an exemplary hearing system that may be implemented according to principles described herein.

FIG. 1 illustrates an exemplary hearing system 100 ("system 100") that may be implemented according to principles described herein. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device such as described herein. In other examples, memory 102 and/or processor 104 may be distributed between multiple devices and/or multiple locations as may serve a particular implementation. Illustrative implementations of system 100 are described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store hearing loss profile data, user preference data, setting data, acoustic parameter data, machine learning data, input sound classification data, hearing performance data, graphical user interface content, and/or any other suitable data.

Processor 104 may be configured to perform (e.g., execute instructions 106 stored in memory 102 to perform) various processing operations associated with fitting a hearing device. For example, processor 104 may perform one or more operations described herein to set, based on a plurality of speech recognition levels for a plurality of audio prompts at different presentation levels, an active noise canceling (ANC) strength for use in a normal operation mode of the hearing device. These and other operations that may be performed by processor 104 are described herein.

As used herein, a "hearing device" may be implemented by any device or combination of devices configured to provide or enhance hearing to a user. For example, a hearing device may be implemented by a hearing aid configured to amplify audio content to a recipient, a sound processor included in a stimulation system configured to apply electrical and acoustic stimulation to a recipient, or any other suitable hearing prosthesis. In some examples, a hearing device may be implemented by a behind-the-ear ("BTE") housing configured to be worn behind an ear of a user. In some examples, a hearing device may be implemented by an in-the-ear ("ITE") component configured to at least partially be inserted within an ear canal of a user. In some examples, a hearing device may include a combination of an ITE component, a BTE housing, and/or any other suitable component.

In certain examples, hearing devices such as those described herein may be implemented as part of a binaural hearing system. Such a binaural hearing system may include a first hearing device associated with a first ear of a user and a second hearing device associated with a second ear of a user. In such examples, the hearing devices may each be implemented by any type of hearing device configured to provide or enhance hearing to a user of a binaural hearing system. In some examples, the hearing devices in a binaural system may be of the same type. For example, the hearing devices may each be hearing aid devices. In certain alternative examples, the hearing devices may be of a different type.

In some examples, a hearing device may additionally or alternatively include earbuds, headphones, hearables (e.g., smart headphones), and/or any other suitable device that may be used to facilitate a user perceiving sound in an environment. In such examples, the user may correspond to either a hearing impaired user or a non-hearing impaired user.

Figure 2:
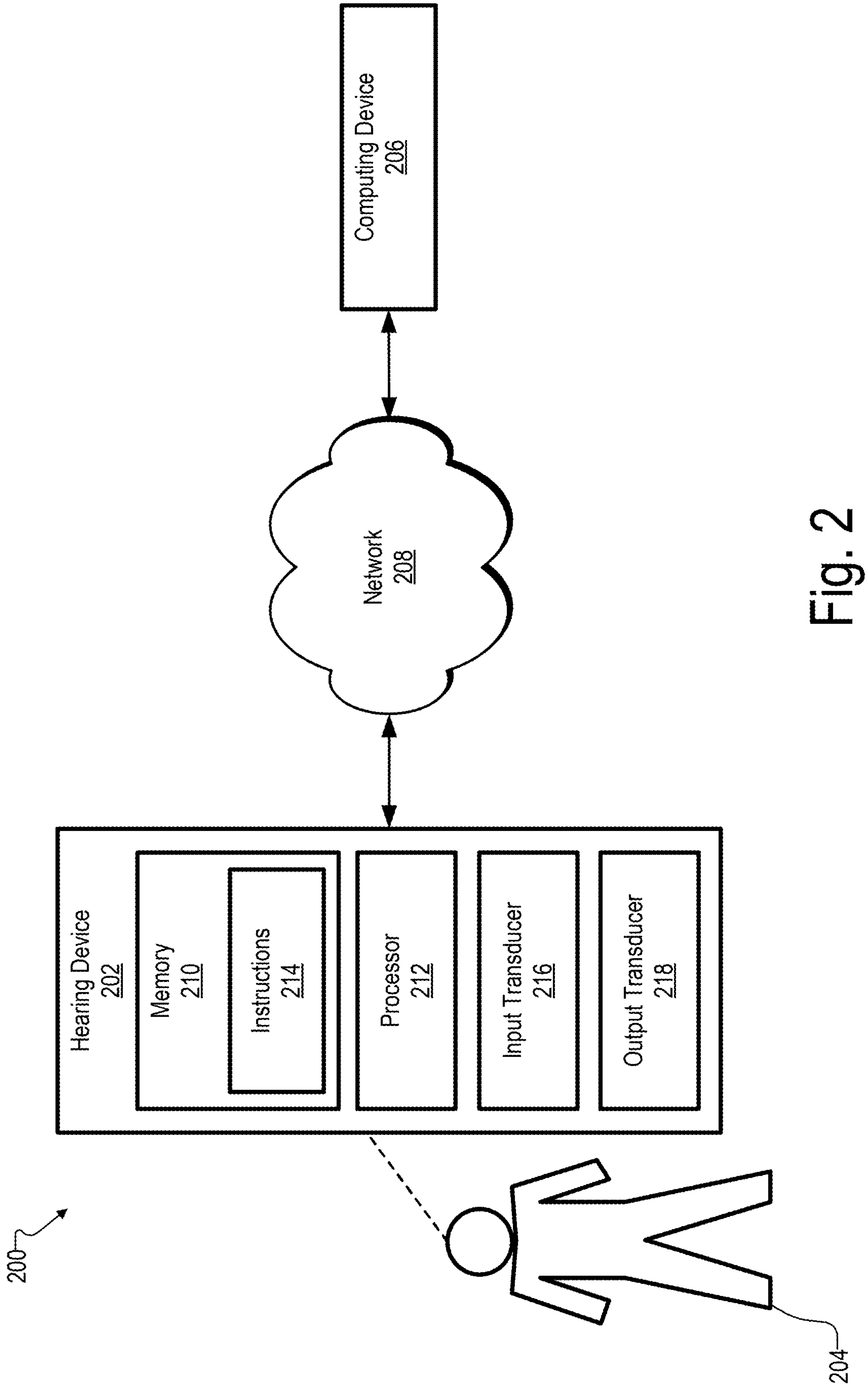
FIG. 2 illustrates an exemplary implementation of the hearing system of FIG. 1 according to principles described herein.

System 100 may be implemented in any suitable manner. For example, system 100 may be implemented by a hearing device and/or a computing device that is communicatively coupled in any suitable manner to the hearing device. To illustrate an example, FIG. 2 shows an exemplary implementation 200 in which system 100 may be provided in certain implementations. As shown in FIG. 2, implementation 200 includes a hearing device 202 that is associated with a user 204 and that is communicatively coupled to a computing device 206 by way of a network 208.

Hearing device 202 may correspond to any suitable type of hearing device such as described herein. Hearing device 202 may include, without limitation, a memory 210 and a processor 212 selectively and communicatively coupled to one another. Memory 210 and processor 212 may each include or be implemented by hardware and/or software components (e.g., processors, memories, communication interfaces, instructions stored in memory for execution by the processors, etc.). In some examples, memory 210 and processor 212 may be housed within or form part of a BTE housing. In some examples, memory 210 and processor 212 may be located separately from a BTE housing (e.g., in an ITE component). In some alternative examples, memory 210 and processor 212 may be distributed between multiple devices (e.g., multiple hearing devices in a binaural hearing system) and/or multiple locations as may serve a particular implementation.

Memory 210 may maintain (e.g., store) executable data used by processor 212 to perform any of the operations associated with hearing device 202. For example, memory 210 may store instructions 214 that may be executed by processor 212 to perform any of the operations associated with hearing device 202 assisting a user in hearing. Instructions 214 may be implemented by any suitable application, software, code, and/or other executable data instance.

Memory 210 may also maintain any data received, generated, managed, used, and/or transmitted by processor 212. For example, memory 210 may maintain any suitable data associated with a hearing loss profile of a user, input sound classifications, sound processing patterns, machine learning algorithms, and/or hearing device function data. Memory 210 may maintain additional or alternative data in other implementations.

Processor 212 is configured to perform any suitable processing operation that may be associated with hearing device 202. For example, when hearing device 202 is implemented by a hearing aid device, such processing operations may include monitoring ambient sound and/or representing sound to user 204 via an in-ear receiver. Processor 212 may be implemented by any suitable combination of hardware and software. In certain examples, processor 212 may correspond to or otherwise include one or more deep neural network ("DNN") chips configured to perform any suitable machine learning operation such as described herein.

Hearing device 202 may further include an input transducer 216 and an output transducer 218. Hearing device 202 may include additional or alternative components as may serve a particular implementation.

Input transducer 216 may include one or more electroacoustic transducers, e.g., one or more microphones and/or one or more microphone arrays. The one or more microphones may be implemented by one or more suitable audio detection devices configured to detect audio data representative of one or more audio signals presented to a user of hearing device 202. The one or more audio signals may include, for example, audio content (e.g., music, speech, noise, etc.) generated by one or more audio sources included in an environment of the user (e.g., environmental audio/sound). Each microphone may be included in or communicatively coupled to hearing device 202 in any suitable manner.

Additionally or alternatively, input transducer 216 may include a radio frequency (RF) receiver configured to receive RF signals including audio data representative of one or more audio signals presented to the user of hearing device 202. For instance, the RF signals may be received in accordance with a Bluetooth™ protocol and/or by a mobile phone network such as 4G or 5G and/or by any other type of RF communication such as, for example, data communication via an internet connection and/or data communication at a frequency in a GHz range. The audio signal may include, for example, a phone call signal and/or a streaming signal which may be received while delivered from an audio provider, such as a phone call signal provider and/or a streaming media provider and/or may comprise a signal transmitted from a source device, e.g., a smartphone. Each RF receiver may be included in hearing device 202 and/or communicatively coupled to hearing device 202 in any suitable manner.

Output transducer 218 may be implemented by any suitable audio output device, for instance a loudspeaker of a hearing device.

User 204 may be any individual that is a user of a hearing device. Computing device 206 may include or be implemented by any suitable hardware and/or software components (e.g., processors, memories, communication interfaces, instructions stored in memory for execution by the processors, etc.) and may include any combination of computing devices as may serve a particular implementation. In some examples, computing device 206 may be implemented by a mobile phone, a mobile computing device, a tablet computer, a laptop computer, a desktop computer, a server or server system, and/or any other suitable computing device and/or system that may be configured to improve a hearing performance level of the hearing device. In such examples, computing device 206 may be configured to perform any suitable operations such as those described herein to facilitate fitting for user 204 of hearing device 202 using active noise cancellation.

Network 208 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, and any other networks capable of carrying data and/or communications signals between hearing device 202 and computing device 206. In certain examples, network 208 may be implemented by a Bluetooth protocol (e.g., Bluetooth Classic, Bluetooth Low Energy ("LE"), etc.) and/or any other suitable communication protocol to facilitate communications between hearing device 202 and computing device 206. Communications between hearing device 202, computing device 206, and any other device/system may be transported using any one of the above-listed networks, or any combination or sub-combination of the above-listed networks.

System 100 may be implemented by computing device 206 or hearing device 202. Alternatively, system 100 may be distributed across computing device 206 and hearing device 202, or distributed across computing device 206, hearing device 202, and/or any other suitable computing system/device.

Hearing device 202 may be configured to be optimized for user 204 by fitting hearing device 202 in a manner customized for user 204. Fitting hearing device 202 may include setting parameters of hearing device 202 for individualized hearing needs of user 204. In some examples, hearing device 202 may be fit by a hearing care professional. In other examples, system 100 may be configured to facilitate fitting by a user of hearing device 202 (e.g., self-fitting). For instance, system 100 (e.g., computing device 206 and/or hearing device 202) may receive input from user 204 based on which system 100 may determine values for parameters of hearing device 202 to provide optimal sound quality to user 204. In some examples, the fitting process may include measuring an audiogram or a pseudo audiogram and determining parameter settings (e.g., gain levels, etc.) based on the audiogram.

However, some users may experience hidden hearing loss, where the user may have a relatively normal audiogram but have difficulty hearing in noise. For such users, a conventional fitting approach may not result in optimized settings of hearing device 202 for the user. Rather, such users may benefit from a global reduction in loudness, which may be implemented by hearing device 202 in any suitable manner. For example, hearing device 202 may use active noise cancellation to lower the loudness of the audio environment of user 204. Additionally or alternatively, hearing device 202 may present audio detected by hearing device 202 to user 204 at a reduced level.

However, applying ANC (or reducing the presented audio level) may also result in a decrease in environmental awareness for user 204. Further, ANC may subject user 204 to the Lombard effect, where when user 204 speaks, user 204 may speak at a level not appropriate to the actual environmental sound level as the presented environmental sound level to user 204 by hearing device 202 is lowered by the ANC. Thus, system 100 may be configured to determine an optimal ANC strength as part of a fitting process.

For example, system 100 may be configured to operate in a fitting mode and a normal operation mode. System 100 may operate in fitting mode during a fitting session to determine parameter settings for operating in the normal operation mode, which normal operation mode may include any operation of system 100 where system 100 is presenting audio (e.g., from an environment of user 204, a device, etc.) to user 204. During the fitting session, system 100 may present to user 204 a plurality of audio prompts at different presentation levels. System 100 may receive input from user 204 for each of the audio prompts and determine a speech recognition level for each presentation level. Based on the speech recognition levels, system 100 may determine an optimal presentation level that optimizes between speech recognition and environmental sound reduction. Based on the optimal presentation level, system 100 may set an ANC strength that effects the optimal presentation level for use during normal operation.

Figure 3:
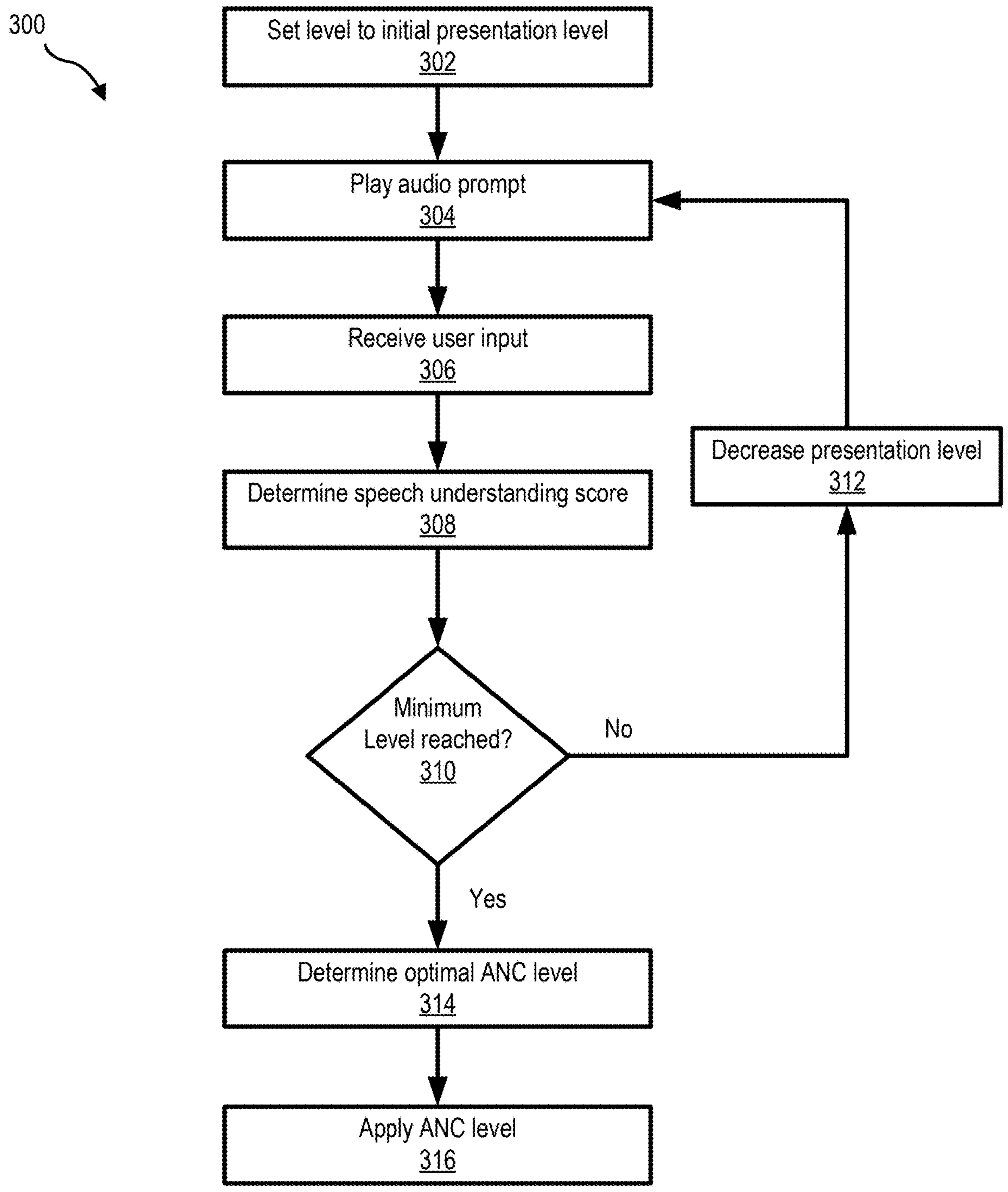
FIG. 3 illustrates an exemplary method according to principles described herein.

For instance, FIG. 3 shows an example method 300 for determining an ANC strength during a fitting session. While FIG. 3 illustrates exemplary operations according to one embodiment, other embodiments may omit, add to, reorder, and/or modify any of the operations shown in FIG. 3. One or more of the operations shown in FIG. 3 may be performed by a hearing device such as hearing device 202, a computing device such as computing device 206, an additional computing device communicatively coupled to computing device 206 and/or hearing device 202, any components included therein, and/or any combination or implementation thereof.

At operation 302, a hearing system such as hearing system 100 may set a level of an audio prompt to an initial presentation level. The initial presentation level may be any suitable sound level, such as a full environmental sound level (e.g., a presentation level corresponding to no ANC applied to a current environment of user 204 or a default environment), an amplified environmental sound level, a default reduced level (e.g., a predetermined starting reduced level, a customized starting reduced level based on previous settings or fitting sessions, etc.). Additionally or alternatively, user 204 may set and/or adjust the initial presentation level. For instance, if an initial presentation level is too loud or too soft, user 204 may indicate as such and system 100 may adjust the initial presentation level accordingly. Additionally or alternatively, user 204 may indicate a typical environment where user 204 expects to use hearing device 202 (e.g., select from a list of environments, provide an audio sample of the typical environment, etc.). Based on the selected environment, system 100 may set the initial presentation level to a typical level of the selected environment.

Additionally or alternatively, user 204 may provide an indication that user 204 is in an environment for which user 204 expects to use hearing device 202. In response, system 100 may detect and store the environmental sound level for setting the initial presentation level during a later fitting session.

At operation 304, system 100 may play the audio prompt. The audio prompt may be any suitable auditory stimulus that includes speech so that system 100 may determine an understanding level of the speech by user 204.

Figure 4:
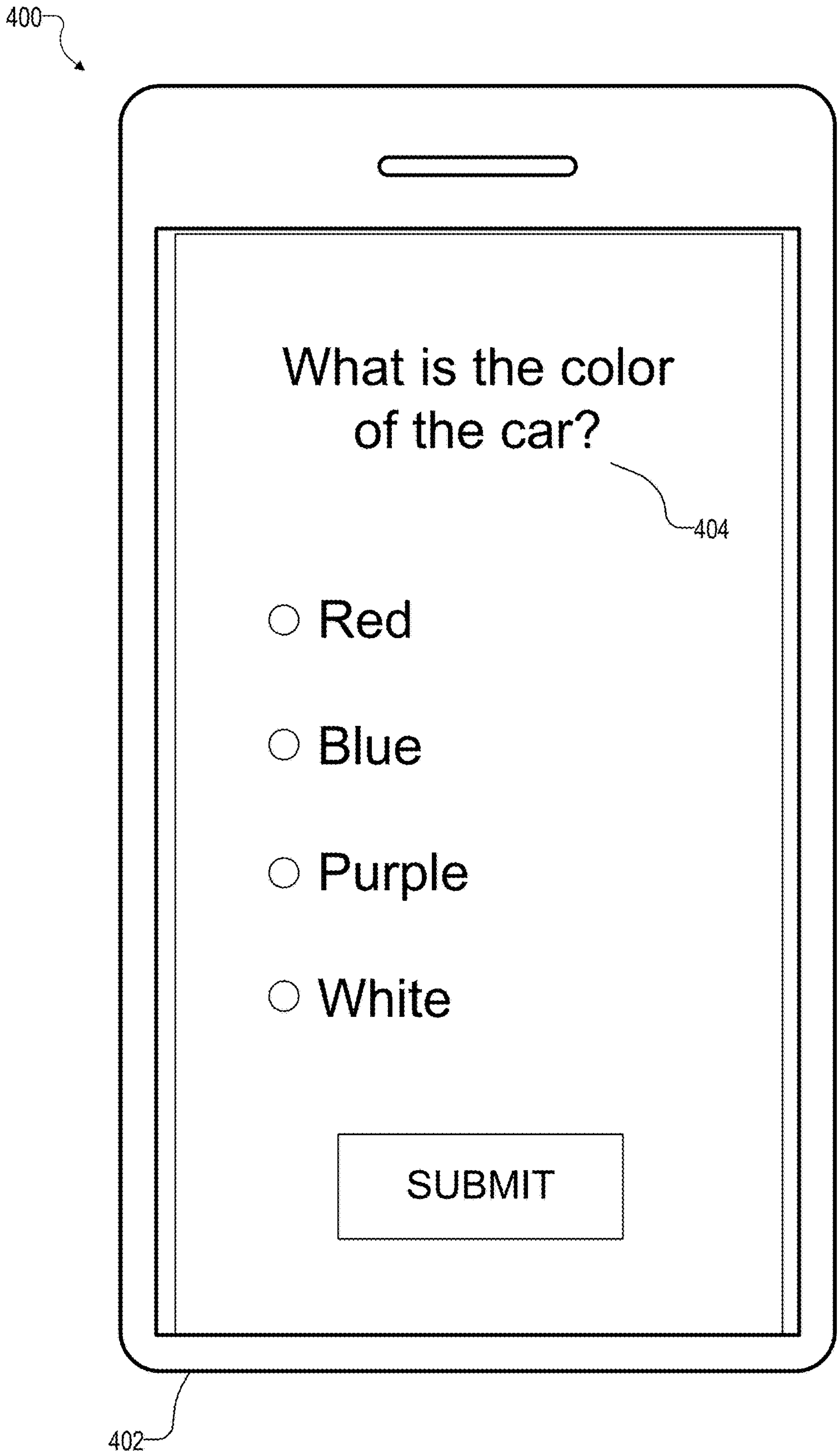
FIG. 4 illustrates an exemplary configuration that may be provided according to principles described herein.

At operation 306, system 100 may receive user input. The user input may be any suitable input from which system 100 may determine understanding of the speech in the audio prompt. System 100 may receive the user input in any suitable manner. For example, system 100 may receive the user input via hearing device 202 and/or computing device 206, such as by having user 204 repeat the audio prompt as user 204 understood it. Additionally or alternatively, system 100 may receive the user input via computing device 206 by having user 204 type the speech or answer questions about the content of the speech. For instance, FIG. 4 shows an example configuration 400 that shows an implementation of computing device 206 (e.g., a phone 402). System 100 may present via phone 402 a question 404 that tests the comprehension of the speech in the audio prompt.

At operation 308, system 100 may determine a speech recognition level. For example, system 100 may determine a speech understanding score based on the user input. System 100 may determine the speech understanding score in any suitable manner. For instance, system 100 may compare a repeating of the audio prompt by user 204 (whether an audio recording of user 204 repeating the audio prompt and/or a typed repeating of the audio prompt) to the speech in the audio prompt and calculate a score based on how many words are correct or incorrect, how close the incorrect words are to correct words, etc. Additionally or alternatively, system 100 may use correct/incorrect answers to speech comprehension questions (e.g., as in configuration 400) to calculate a score. For example, system 100 may present a plurality of questions based on the audio prompt (and/or a plurality of audio prompts at a same presentation level) and calculate the speech understanding score based on the correct/incorrect answers.

At operation 310, system 100 may determine whether a minimum presentation level has been reached. The minimum presentation level may be any suitable minimum presentation level, such as a maximum ANC strength implemented by hearing device 202, a predetermined minimum presentation level (e.g., between 50 and 65 decibels or any other suitable sound level where speech recognition may not be expected to change dramatically), etc. Additionally or alternatively, the minimum presentation level may be set and/or adjusted by user 204.

If the minimum presentation level has not been met, at operation 312, system 100 decreases the presentation level. System 100 may decrease the presentation level in any suitable manner. For example, system 100 may decrease the presentation level at predetermined amounts, such as spacing a predetermined number of presentation levels between the initial presentation level and the minimum presentation level. In some examples, the spacing between presentation levels may be even. Additionally or alternatively, the presentation levels may be spaced such that system 100 presents audio prompts at more presentation levels around a particular presentation level (e.g., based on a typical optimal presentation level, on previous fitting sessions, on user input, etc.). Additionally or alternatively, system 100 may decrease the presentation level dynamically, based on the user input. For instance, system 100 may decrease the presentation level an amount based on a speech understanding score. For example, a low speech recognition level may indicate that user 204 is further from an optimal presentation level and, conversely, a high speech recognition level may indicate that user 204 is closer to the optimal presentation level. Thus, based on different speech recognition levels system 100 may decrease the presentation level differently, such as decreasing the presentation level based on an inverse proportion to the speech understanding score, decreasing the presentation level a greater amount if the speech understanding score is below a threshold score, a lesser amount if the speech understanding score is above another threshold score, etc.

While operation 312 indicates system 100 decreases the presentation level, in some examples, system 100 may increase the presentation level. For instance, if system 100 is dynamically adjusting an amount of change in presentation levels, system 100 may decrease a presentation level more than optimal and fine tune the optimal presentation level by receiving user input to an increased presentation level.

After decreasing (or increasing) the presentation level, at operation 304, system 100 may play another audio prompt at the new presentation level. System 100 may then perform operations 306-310 at the new presentation level to determine a speech recognition level for the new presentation level.

Figure 5:
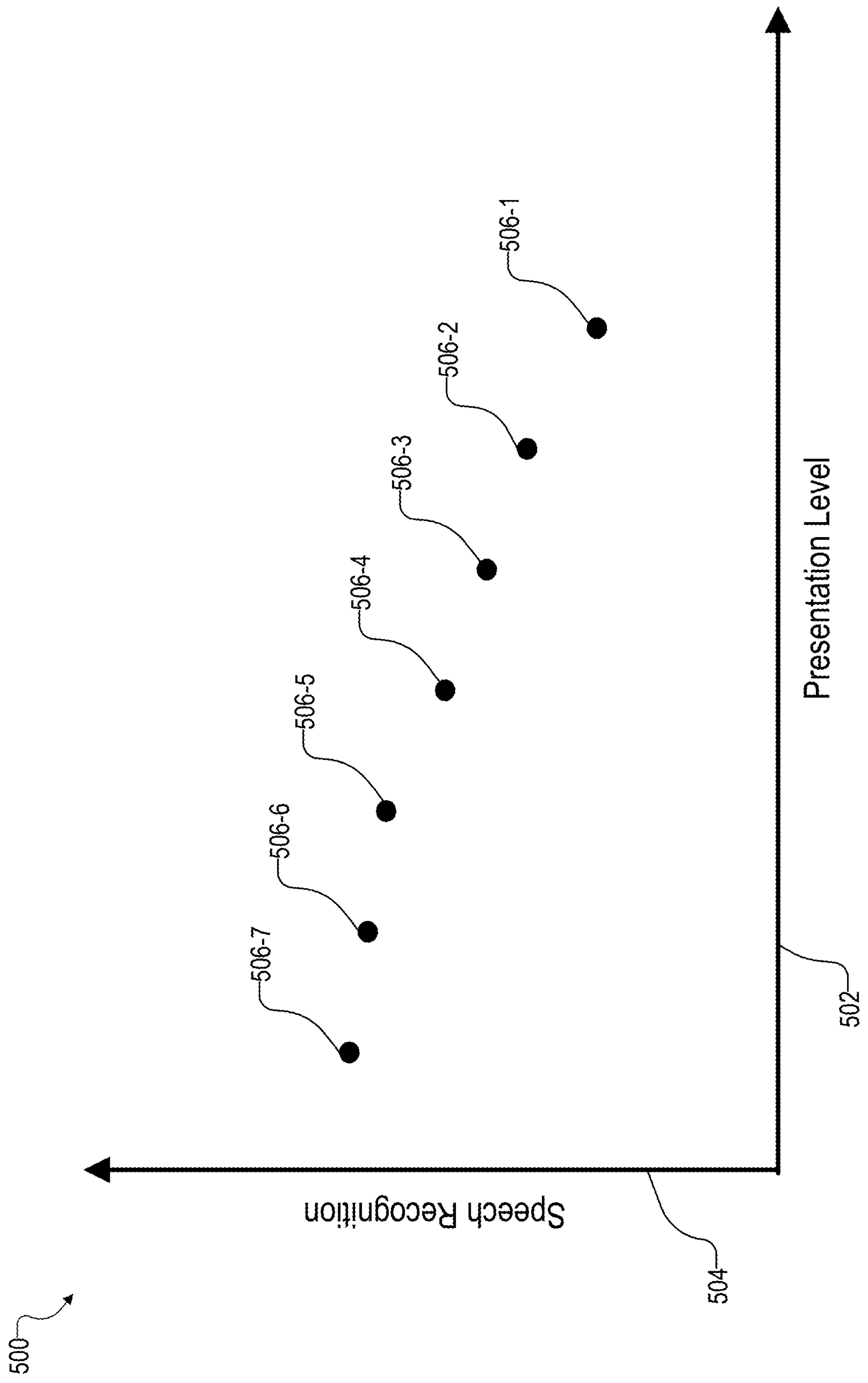
FIG. 5 illustrates an exemplary graph according to principles described herein.

Once the minimum presentation level is reached at operation 310, at operation 314, system 100 may determine an optimal ANC strength. The optimal ANC strength may be determined in any suitable manner. For example, the optimal ANC strength may be an ANC strength that effects a presentation level where the speech recognition level meets a threshold speech recognition level. For instance, FIG. 5 shows an example graph 500 that shows a plurality of speech recognition levels 502 corresponding to a plurality of presentation levels 504. Each data point 506 (e.g., data points 506-1 through 506-7) may represent a particular speech recognition level (e.g., a speech understanding score or any other suitable representation of the speech recognition level) at a respective presentation level for user 204, which may be determined based on input from user 204 as described herein.

Based on each of the speech recognition levels at each respective presentation level, system 100 may determine an optimal presentation level in any suitable manner. For example, the optimal presentation level may be the presentation level that corresponds to a speech recognition level that meets a threshold speech recognition level. The threshold speech recognition level may be any suitable threshold level, such as a predetermined absolute speech recognition level or a predetermined relative speech recognition level. For instance, the threshold speech recognition level may be based on a difference between different speech recognition levels. For example, the threshold level may be based on an amount of increase of the speech recognition level from a baseline speech recognition level (e.g., as represented by data point 506-1, which may correspond to a maximum presentation level or any other suitable baseline speech recognition level). For instance, the threshold level may be where the speech recognition level increases by 50% (or any other suitable amount) compared to the speech recognition level at data point 506-1 or any other suitable baseline. Additionally or alternatively, the threshold level may be based on an amount of decrease of the speech recognition level from another baseline speech recognition level (e.g., as represented by data point 506-7, which may correspond to a minimum presentation level and/or a maximum speech recognition level for user 204, or any other suitable speech recognition level). For example, the threshold level may be where the speech recognition level drops by 20% (or any other suitable amount) compared to the speech recognition level at data point 506-7. As another example, the threshold level may be where the speech recognition level is at some suitable level between the speech recognition level at data point 506-1 and data point 506-7.

Additionally or alternatively, the threshold level may be based on sequential speech recognition levels. For instance, the threshold level may correspond to a presentation level where the speech recognition level flattens, which may indicate diminishing returns of increases to speech recognition level for decreasing of presentation level. Such a level at (or prior to) the flattening of the speech recognition curve may represent an optimal level for maximizing speech recognition while minimizing reduction of environmental awareness and/or susceptibility to the Lombard effect for user 204. In graph 500, an example of such a level may be represented by data point 506-5, where the increase in speech recognition level from data point 506-5 to data point 506-6 and data point 506-7 decreases relative to the difference in speech recognition level from data point 506-4 to data point 506-5.

Such an optimal level may be determined in any suitable manner. For instance, the differences between speech recognition level between sequential data points 506 (and/or a plurality of neighboring data points 506 from each data point 506) may be compared. Additionally or alternatively, system 100 may fit a curve to data points 506 and calculate the optimal level based on a corresponding equation of the curve an optimal point (e.g., based on a derivative, a second derivative, etc. of the equation). As such, an optimal presentation level (and corresponding ANC strength) may be determined to be at a level between discrete data points 506. Further, while data points 506 are shown evenly spaced across a range of presentation levels, system 100 may fine tune around a particular presentation level as system 100 approaches the optimal presentation level in any suitable manner, such as described herein.

Referring back to operation 314 of FIG. 3, once system 100 determines the optimal presentation level, system 100 may determine the ANC strength that, when applied to detected environmental audio levels, corresponds to the optimal presentation level. As such, system 100 may determine a plurality of ANC strengths for a plurality of environments. Additionally or alternatively, system 100 may dynamically adjust the ANC strength to effect the optimal presentation level based on the detected environmental audio level. At operation 316, system 100 may apply the determined ANC strength.

In addition to different sound levels encountered in different audio environments, different audio environments may also have different signal to noise ratios (SNR), which may further affect the speech recognition level. As such, system 100 may present the plurality of audio prompts at a particular same SNR. System 100 may set the SNR at any suitable SNR level. For instance, system 100 may set the SNR to match an SNR of a current environment of user 204. Additionally or alternatively, system 100 may set the SNR to a predetermined SNR, such as with the initial presentation level of the audio prompts. For instance, user 204 may indicate a typical environment where user 204 expects to use hearing device 202 (e.g., select from a list of environments, provide an audio sample of the typical environment, etc.). Based on the selected environment, system 100 may set the SNR to a typical level of the selected environment. Additionally or alternatively, user 204 may provide an indication that user 204 is in an environment for which user 204 expects to use hearing device 202. In response, system 100 may detect and store the SNR for setting the SNR during a later fitting session.

Further, system 100 may determine a plurality of optimal ANC strengths for use in different profiles of the normal operating mode. For example, system 100 may apply different profiles for different audio environments and/or different hearing applications (e.g., based on hearing intentions of user 204, audio sources, etc.) of user 204. For instance, system 100 may present a plurality of audio prompts at a first SNR that corresponds to one typical environment of user 204 to determine an optimal ANC strength for that environment. System 100 may then present a second plurality of audio prompts at a second SNR that corresponds to an additional typical environment of user 204 to determine an optimal ANC strength for the additional typical environment. System 100 may store the different optimal ANC strengths as different profiles and apply the different profiles accordingly. Further, while examples herein have been directed toward speech recognition, similar systems and methods may be applied to other types of audio content. For instance, audio prompts may be of music and user 204 may provide feedback to optimize for sound quality of the music and/or recognition of notes, melodies, instruments, and/or voices in the music, etc.

Additionally or alternatively, an optimal ANC strength may be defined in any suitable manner. For example, an optimal ANC strength may be a particular amount of ANC applied uniformly to detected environmental audio. Additionally or alternatively, the optimal ANC strength may be defined by an ANC curve, such as a frequency-dependent curve that applies different levels of ANC to different portions of the detected audio. Such an ANC curve may be a predefined ANC curve that optimizes for speech recognition. Additionally or alternatively, system 100 may determine an optimal ANC curve as system 100 presents audio prompts to user 204 and receives feedback. For example, in addition to presentation level, system 100 may adjust applied ANC curves to determine an optimal ANC strength.

Figure 6:
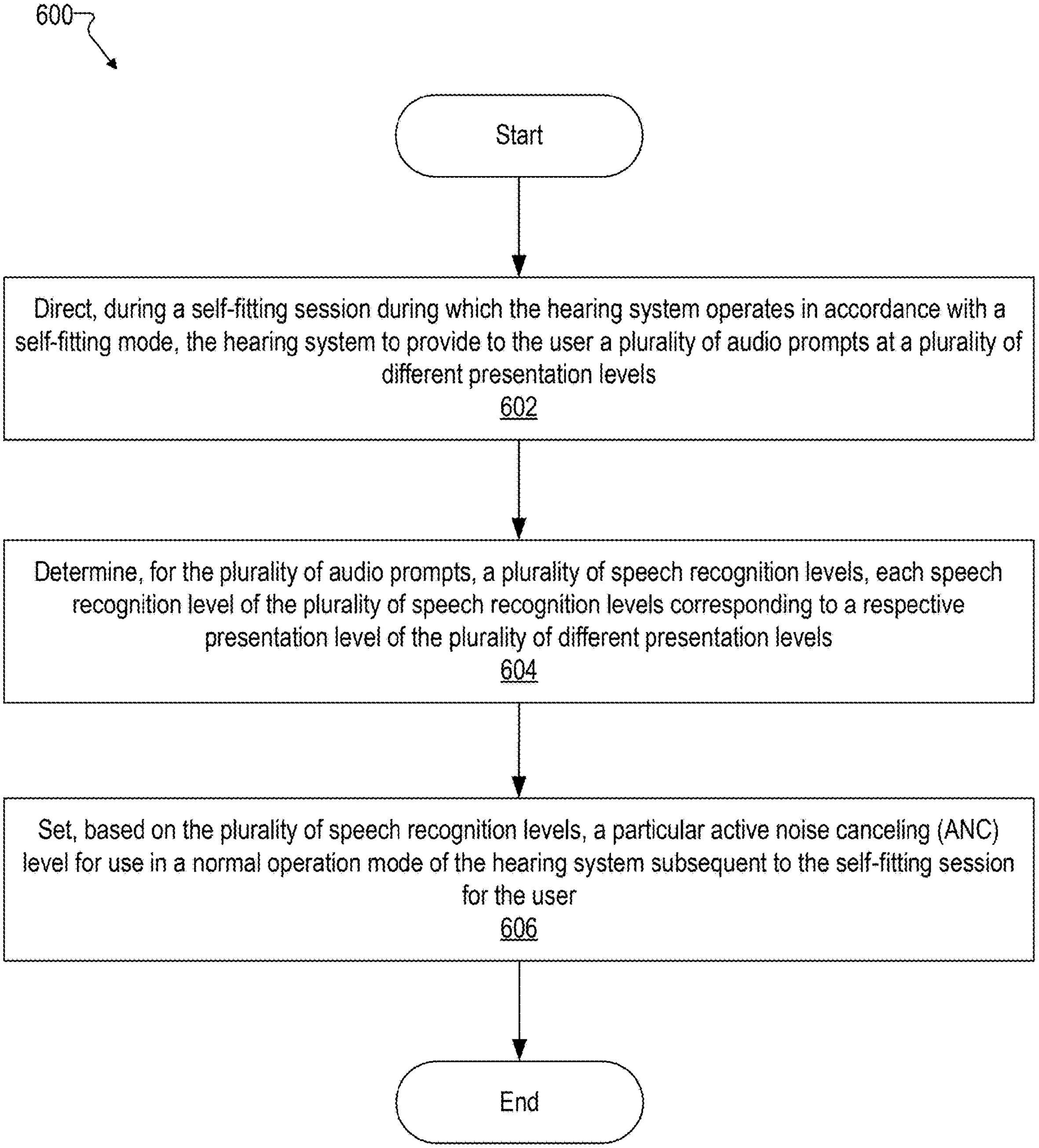
FIG. 6 illustrates an exemplary method according to principles described herein.

FIG. 6 illustrates an exemplary method 600 for facilitating fitting of a hearing device using active noise cancellation according to principles described herein. While FIG. 6 illustrates exemplary operations according to one embodiment, other embodiments may omit, add to, reorder, and/or modify any of the operations shown in FIG. 6. One or more of the operations shown in FIG. 6 may be performed by a hearing device such as hearing device 202, a computing device such as computing device 206, an additional computing device communicatively coupled to computing device 206 and/or hearing device 202, any components included therein, and/or any combination or implementation thereof.

At operation 602, a hearing system such as hearing system 100 may direct, during a fitting session during which the hearing system operates in accordance with a fitting mode, the hearing system to provide to the user a plurality of audio prompts at a plurality of different presentation levels. Operation 602 may be performed in any of the ways described herein.

At operation 604, the hearing system may determine, for the plurality of audio prompts, a plurality of speech recognition levels, each speech recognition level of the plurality of speech recognition levels corresponding to a respective presentation level of the plurality of different presentation levels. Operation 604 may be performed in any of the ways described herein.

At operation 606, the hearing system may set, based on the plurality of speech recognition levels, a particular active noise canceling (ANC) strength for use in a normal operation mode of the hearing system subsequent to the fitting session for the user. Operation 606 may be performed in any of the ways described herein.

In some examples, a computer program product embodied in a non-transitory computer-readable storage medium may be provided. In such examples, the non-transitory computer-readable storage medium may store computer-readable instructions in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 7:
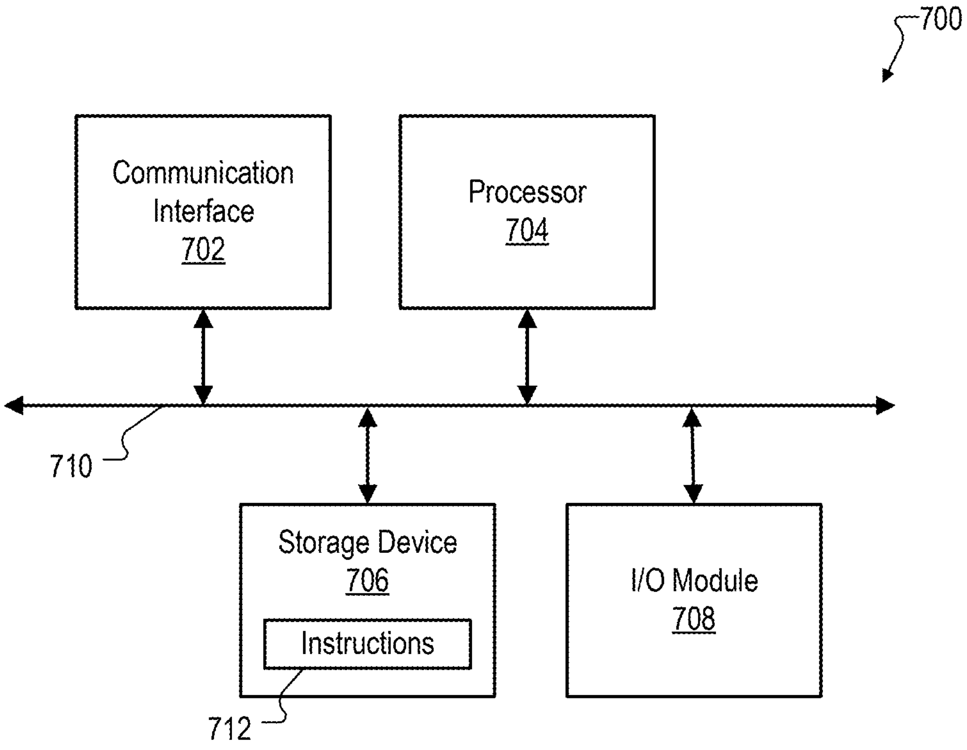
FIG. 7 illustrates an exemplary computing device according to principles described herein.

FIG. 7 illustrates an exemplary computing device 700 that may be specifically configured to perform one or more of the processes described herein. As shown in FIG. 7, computing device 700 may include a communication interface 702, a processor 704, a storage device 706, and an input/output ("I/O") module 708 communicatively connected one to another via a communication infrastructure 710. While an exemplary computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data and/or interpreting, executing, and/or directing execution of one or more of the instructions, processes, and/or operations described herein. Processor 704 may perform operations by executing computer-executable instructions 712 (e.g., an application, software, code, and/or other executable data instance) stored in storage device 706.

Storage device 706 may include one or more data storage media, devices, or configurations and may employ any type, form, and combination of data storage media and/or device. For example, storage device 706 may include, but is not limited to, any combination of the non-volatile media and/or volatile media described herein. Electronic data, including data described herein, may be temporarily and/or permanently stored in storage device 706. For example, data representative of computer-executable instructions 712 configured to direct processor 704 to perform any of the operations described herein may be stored within storage device 706. In some examples, data may be arranged in one or more databases residing within storage device 706.

I/O module 708 may include one or more I/O modules configured to receive user input and provide user output. I/O module 708 may include any hardware, firmware, software, or combination thereof supportive of input and output capabilities. For example, I/O module 708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the systems, hearing devices, computing devices, and/or other components described herein may be implemented by computing device 700. For example, memory 102 and/or memory 210 may be implemented by storage device 706, and processor 104 and/or processor 212 may be implemented by processor 704.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method of facilitating fitting of a hearing system worn by a user, the method comprising:

directing, by a processor during a fitting session during which the hearing system operates in accordance with a fitting mode, the hearing system to provide to the user a plurality of audio prompts at a plurality of different presentation levels;

determining, by the processor and for the plurality of audio prompts, a plurality of speech recognition levels, each speech recognition level of the plurality of speech recognition levels corresponding to a respective presentation level of the plurality of different presentation levels; and setting, by the processor and based on the plurality of speech recognition levels, a particular active noise canceling (ANC) strength for use in a normal operation mode of the hearing system subsequent to the fitting session for the user, the setting the particular ANC strength comprising determining the particular ANC strength that corresponds to a first speech recognition level of the plurality of speech recognition levels that meets a threshold difference relative to a second speech recognition level of the plurality of speech recognition levels.

2. The method of claim 1, wherein the threshold difference comprises a predetermined increase relative to the second speech recognition level, wherein the second speech recognition level corresponds to a maximum presentation level of the plurality of different presentation levels.

3. The method of claim 1, wherein the threshold difference comprises a decrease in differences between sequential speech recognition levels of the plurality of speech recognition levels.

4. The method of claim 1, wherein the plurality of audio prompts at the plurality of different presentation levels comprise a same signal to noise ratio (SNR).

5. The method of claim 4, wherein the SNR is determined based on an SNR representative of an environment of the user.

6. The method of claim 1, wherein:

the plurality of audio prompts comprises a first plurality of audio prompts at a first SNR representative of a first environment and a second plurality of audio prompts at second SNR representative of a second environment; and the setting the particular ANC strength comprises setting the particular ANC strength for a first profile of the normal operation mode and setting an additional ANC strength for a second profile of the normal operation mode.

7. The method of claim 1, wherein the particular ANC strength is defined by a frequency-dependent ANC curve.

8. A computer program product embodied in a non-transitory computer-readable storage medium and comprising computer instructions for performing a process comprising:

directing, during a fitting session during which a hearing system operates in accordance with a fitting mode, the hearing system to provide to a user of the hearing system a plurality of audio prompts at a plurality of different presentation levels;

determining, for the plurality of audio prompts, a plurality of speech recognition levels, each speech recognition level of the plurality of speech recognition levels corresponding to a respective presentation level of the plurality of different presentation levels; and setting, based on the plurality of speech recognition levels, a particular active noise canceling (ANC) strength for use in a normal operation mode of the hearing system subsequent to the fitting session for the user, the setting the particular ANC strength comprising determining the particular ANC strength that corresponds to a first speech recognition level of the plurality of speech recognition levels that meets a threshold difference relative to a second speech recognition level of the plurality of speech recognition levels.

9. The computer program product of claim 8, wherein the threshold difference comprises a predetermined increase relative to the second speech recognition level, wherein the second speech recognition level corresponds to a maximum presentation level of the plurality of different presentation levels.

10. The computer program product of claim 8, wherein the threshold difference comprises a decrease in differences between sequential speech recognition levels of the plurality of speech recognition levels.

11. The computer program product of claim 8, wherein the plurality of audio prompts at the plurality of different presentation levels comprise a same signal to noise ratio (SNR).

12. The computer program product of claim 11, wherein the SNR is determined based on an SNR representative of an environment of the user.

13. The computer program product of claim 8, wherein:

the plurality of audio prompts comprises a first plurality of audio prompts at a first SNR representative of a first environment and a second plurality of audio prompts at second SNR representative of a second environment; and the setting the particular ANC strength comprises setting the particular ANC strength for a first profile of the normal operation mode and setting an additional ANC strength for a second profile of the normal operation mode.

14. The computer program product of claim 8, wherein the particular ANC strength is defined by a frequency-dependent ANC curve.

15. A system comprising:

a memory that stores instructions; and a processor communicatively coupled to the memory and configured to execute the instructions to perform a process comprising:

directing, during a fitting session during which a hearing system operates in accordance with a fitting mode, the hearing system to provide to a user of the hearing system a plurality of audio prompts at a plurality of different presentation levels;

determining, for the plurality of audio prompts, a plurality of speech recognition levels, each speech recognition level of the plurality of speech recognition levels corresponding to a respective presentation level of the plurality of different presentation levels; and setting, based on the plurality of speech recognition levels, a particular active noise canceling (ANC) strength for use in a normal operation mode of the hearing system subsequent to the fitting session for the user, the setting the particular ANC strength comprising determining the particular ANC strength that corresponds to a first speech recognition level of the plurality of speech recognition levels that meets a threshold difference relative to a second speech recognition level of the plurality of speech recognition levels.

16. The system of claim 15, wherein the threshold difference comprises a predetermined increase relative to the second speech recognition level, wherein the second speech recognition level corresponds to a maximum presentation level of the plurality of different presentation levels.

17. The system of claim 15, wherein the threshold difference comprises a decrease in differences between sequential speech recognition levels of the plurality of speech recognition levels.

* * * * *